United States Patent [19]

Yeakle

[11] Patent Number: 4,830,563
[45] Date of Patent: May 16, 1989

[54] MULTI-CONDITION RESPONSIVE VEHICLE RESTRAINING APPARATUS

[75] Inventor: William H. Yeakle, Angola, Ind.

[73] Assignee: Vestil Manufacturing Company, Angola, Ind.

[21] Appl. No.: 59,920

[22] Filed: Jun. 9, 1987

[51] Int. Cl.[4] .................. B65G 69/00; B65G 67/02
[52] U.S. Cl. ................................ 414/401; 340/686; 340/687; 91/275
[58] Field of Search .............. 414/396, 401, 584; 14/71.1; 340/686, 687; 91/1, 275

[56] References Cited

U.S. PATENT DOCUMENTS

| | | | |
|---|---|---|---|
| 2,693,284 | 11/1954 | Gerhardt | 414/584 |
| 3,250,408 | 5/1965 | Daniluk et al. | 414/401 |
| 4,127,856 | 11/1978 | Bickel | 414/401 |
| 4,146,888 | 3/1979 | Grunewald et al. | 414/401 |
| 4,176,586 | 12/1979 | Stoll et al. | 91/275 X |
| 4,191,503 | 3/1980 | Neff et al. | 414/401 |
| 4,208,161 | 6/1980 | Hipp et al. | 414/401 |
| 4,264,259 | 4/1981 | Hipp | 414/401 |
| 4,267,748 | 5/1981 | Grunewald et al. | 414/401 |
| 4,282,621 | 8/1981 | Anthony et al. | 414/401 |
| 4,373,847 | 2/1983 | Hipp et al. | 414/401 |
| 4,379,354 | 4/1983 | Hahn et al. | 414/401 |
| 4,400,127 | 8/1983 | Metz | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 414/401 |
| 4,553,895 | 11/1985 | Ellis | 414/401 |
| 4,555,211 | 11/1985 | Metz | 414/401 |
| 4,589,813 | 5/1986 | Hagen et al. | 414/401 |
| 4,648,781 | 3/1987 | Sikora | 414/401 |
| 4,664,582 | 5/1987 | Edmeads | 414/401 |
| 4,674,941 | 6/1987 | Hageman | 414/401 |
| 4,692,755 | 9/1987 | Hahn | 414/401 X |

Primary Examiner—Robert J. Spar
Assistant Examiner—Gary A. Cundiff
Attorney, Agent, or Firm—George Pappas

[57] ABSTRACT

A multi-condition responsive vehicle restraining apparatus includes a hook member having an edge for contacting an ICC bar on a vehicle and a tip located at one end of the edge and extending upwardly therefrom for restraining the ICC bar from passing the hook member. A beam arrangement mounts the hook member and is movable for moving the hook member on a forward stroke from an inoperative lowered toward an operative raised position and on a return stroke away from the operative raised toward the inoperative lowered position. A double-acting hydraulic cylinder is connected to the beam arrangement for actuating the same to move the hook member on its forward and return strokes. Components are provided for sensing the presence of any one of three conditions concerning the placement of the vehicle ICC bar with respect to the hook member and concurrently therewith providing an indication of which condition prevails. The conditions are that restraint of the vehicle has been either properly engaged, improperly engaged, or missed.

7 Claims, 5 Drawing Sheets

MULTI-CONDITION RESPONSIVE VEHICLE RESTRAINING APPARATUS

BACKGROUND OF THE INVENTION

1. Field of the Invention

The present invention generally relates to the loading and unloading of vehicles, such as trucks and tractor trailers, parked at loading docks and, more particularly, is concerned with a vehicle restraining apparatus responsive to several different conditions which can arise due to the location of the rear of the vehicle relative to the restraining apparatus and which conditions necessitate that an alternative course of action be taken in restraining the vehicle at the loading dock.

2. Description of the Prior Art

Cargo is typically loaded onto and unloaded from vehicles, such as trucks and tractor trailers, while backed up to loading docks. Movement of the vehicle away from the dock while the loading or unloading operations are being performed can cause injury to workmen and damage to material handling equipment, such as forklifts, and to the cargo being handled.

Various ways have been employed heretofore to prevent inadvertent or premature movement of the vehicle. One way is to block or chock the wheels of the vehicle with wheel wedges or blocks. Another way is to use a cable or chain to secure the vehicle to the dock. Yet another way is to employ any of variety of vehicle locking devices mounted on the front of the dock or on the roadway in front of the dock. Various locking devices are disclosed in U.S. Pat. Nos. to Bickel (4,127,856), Grunewald et al., (4,146,888 and 4,267,748), Neff et al., (4,191,503), Hipp et al., (4,208,161 and 4,373,847), Hipp (4,264,259), Anthony et al., (4,282,621), Hahn et al., (4,379,354; 4,443,150 and 4,472,099), Metz (4,400,127 and 4,555,211), Bennett et al., (4,488,325), Ellis (4,553,895) and Hagen et al., (4,589,813). While the vehicle locking devices of those patents would seem to operate reasonably well and generally achieve their objectives under the range of operating conditions for which they were designed, most of those devices do not appear to adequately address the situation where the vehicle, for one reason or another, is not and sometimes cannot be locked by the device. Many of the devices purport to provide locking of the vehicle automatically so as to render chocking of the vehicle wheels unnecessary. However, wheel chocking may be the most readily usable vehicle restraint alternative in situations where securing of the vehicle by the locking device is not achieved for whatever reason.

Consequently, a need exists for a way to alert the dock attendant that locking of the vehicle has not been achieved and some alternative securement technique, such as chocking the wheels, should be employed.

SUMMARY OF THE INVENTION

The present invention provides a vehicle restraining apparatus designed to satisfy the aforementioned needs. The apparatus of the present invention not only normally engages and restrains a vehicle in a secure manner but, rather, it also anticipates the occurrence of conditions which occasionally arise where the vehicle is not or cannot be properly engaged by the apparatus. To positively alert the dock attendant of the presence of such conditions, the apparatus employs features which cause it to reset to its initial inoperative position and to activate both an audible and visual indicator such as a sound alarm and a flashing light (which might read "Chock Wheels"), so that some alternative measure may be undertaken to restrain the vehicle.

Accordingly, the present invention is directed to a multicondition responsive vehicle restraining apparatus including: (a) a hook member having a vehicle-contacting edge and a vehicle-restraining tip located along its edge and extending upwardly therefrom; (b) means mounting the hook member and being movable for moving the hook member on an upward stroke from an inoperative lowered toward an operative raised position and on a return stroke away from the operative raised toward the inoperative lowered position; (c) means for actuating the mounting means to move the hook member on its upward and return strokes; and (d) means for sensing the presence of any one of multiple conditions concerning the placement of a vehicle with respect to the hook member and concurrently therewith providing an indication as to which condition prevails, the conditions being that restraint of the vehicle has been either properly engaged, improperly engaged, or missed.

More particularly, the presence of the one condition, wherein the vehicle restraint has been properly engaged, is sensed when the vehicle is engaged by the vehicle-contacting edge of the hook member. Sensing of such a condition causes termination of actuation of the mounting means which maintains the hook member in restraining relationship with the vehicle, and provides an indication that placement of the hook member in restraining relationship with the vehicle was achieved.

The presence of another condition, wherein vehicle restraint has been improperly engaged, is sensed when the vehicle is engaged by the vehicle-restraining tip of the hook member. Sensing of such condition causes reverse actuation of the mounting means which moves the hook member on its return stroke, and provides an indication that placement of the hook member in restraining relationship with the vehicle was not properly achieved which alerts an attendant audibly and/or visually to follow an alternative course of action to restrain the vehicle.

The presence of yet another condition wherein vehicle restraint has been missed is sensed when the vehicle is not engaged by the hook member. Sensing of such condition causes reverse actuation of the mounting means which moves the hook member on its return stroke, and provides an audible and/or visual indication that placement of the hook member in the restraining relationship with the vehicle was missed which alerts an attendant to follow an alternative course of action to restrain the vehicle.

In one embodiment, the hook member, mounting means and actuating means are disposed externally of a loading dock, whereas in another embodiment the actuating means is disposed internally of the loading dock and the mounting means is disposable at least partially internally of the loading dock with the hook member being situated externally thereof. Still further, in one embodiment the mounting means is a pivotal beam supporting the hook member on a forward end thereof. In another embodiment, the mounting means is a plurality of beams connected together for movement in an extendible and retractable scissors-fashion and supporting the hook member on a forward end thereof. In these embodiments, the hook member at its lower end is pivotally mounted to a beam of the mounting means and at its upper end is secured thereto by a nonpivotal connection provided by a pin which is releasable for allowing pivoting of the hook member relative to the beam and releasing of the vehicle restraint by the hook member.

Further, the actuating means is a double-acting hydraulic cylinder. The sensing means includes a plurality of limit switches, which can be either mechanical or hydraulic force responsive, for respectively sensing displacement of the vehicle-restraining tip or the hook member beyond predetermined amounts and, thus, the occurrence of one of the conditions wherein vehicle restraint is missed.

These and other advantages and attainments of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following description, reference will be made to the attached drawings in which.

Corresponding reference characters indicate corresponding parts throughout the several views of the drawings.

The exemplifications set out herein illustrate preferred embodiments of the invention in one form thereof and, such exemplifications are not to be construed as limiting the scope of the disclosure or the scope of the invention in any manner.

DETAILED DESCRIPTION OF A SPECIFIC EMBODIMENT

Figure 1:
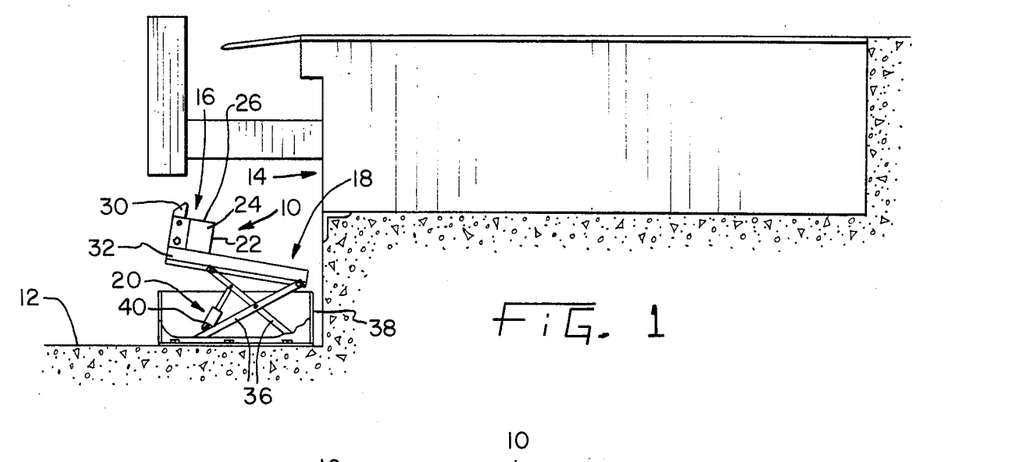
FIG. 1 is a side elevational view of one embodiment of a vehicle restraining apparatus of the present invention shown positioned in front of a loading dock.
Figure 2:
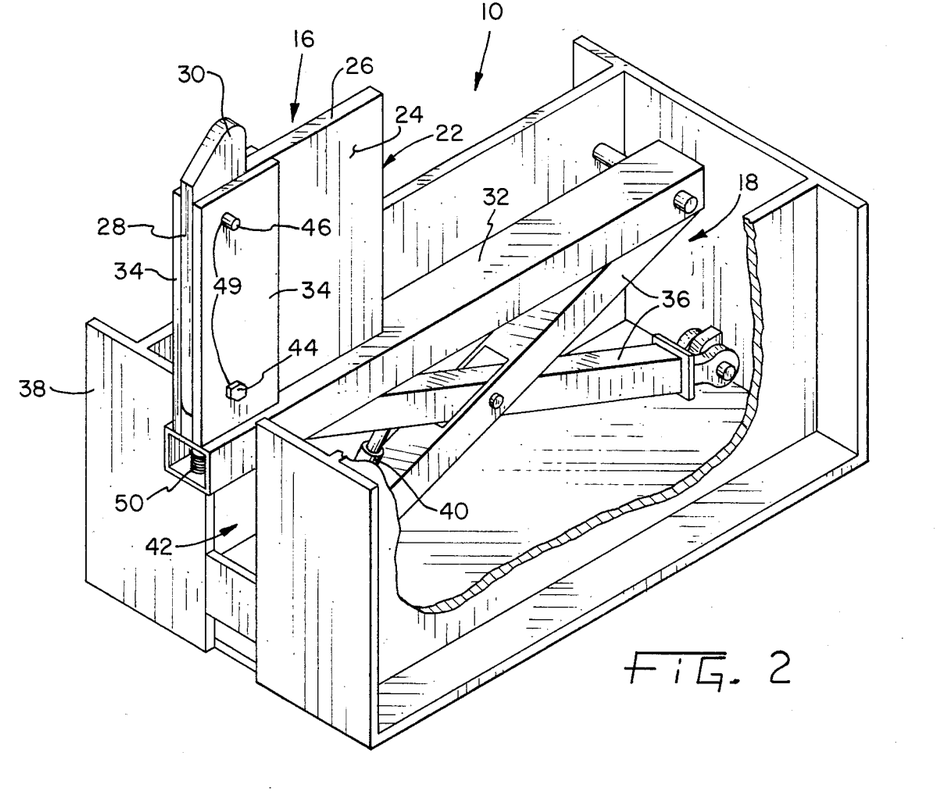
FIG. 2 is a perspective partial cut-away view of the vehicle restraining apparatus of FIG. 1.

Referring now to the drawings, and particularly to FIGS. 1 and 2, there is shown one embodiment of a vehicle restraining apparatus, generally designated by the numeral 10 and comprising the present invention. The vehicle restraining apparatus 10 is shown positioned on a roadway surface 12 directly in front of a loading dock 14. Bumper 15 extends forwardly and out of loading dock 14. As mentioned earlier, the apparatus 10 will not only normally engage and restrain a vehicle via its ICC bar (not shown) or other comparable attachment point on the vehicle when the vehicle has been backed up or "spotted" to the loading dock, but, the apparatus will also respond to the occurrence of conditions which occasionally arise where the vehicle is not or cannot be restrained by the apparatus.

The vehicle restraining apparatus 10 includes a hook member 16, means in the form of a beam arrangement 18 mounting the hook member 16, means 20 for actuating the beam arrangement 18 to move the hook member 16, and means for sensing the presence of any one of three possible conditions that prevails concerning placement of the vehicle ICC bar relative to the hook member 16 of the apparatus. The three conditions are that restraint of the vehicle has been either properly engaged, improperly engaged, or missed by the apparatus 10.

More particularly, hook member 16 generally includes rectangular-shaped upright plate 22 having opposite faces 24 and a generally horizontally-extending upper edge 26 for engaging the vehicle ICC bar and a generally rectangular-shaped upright bar 28 having an upper raised tip 30. Upright plate 22 is rigidly fixed upon an elongate upper beam 32 of the beam arrangement 18, whereas the bar 28 is supported between a pair of laterally-spaced upstanding plates 34 each of which is fixed on the forward end of beam 32 and on a respective face 24 of upright plate 22. In such manner, the raised tip 30 of bar 28 is located at the forward end of the edge 26 and extends upwardly therefrom for restraining the overlying vehicle ICC bar from moving past the forward end of edge 26 and being released from the hook member 16.

The beam arrangement 18, as shown in the embodiment of FIGS. 1 and 2, includes a pair of support beams 36. Support beams 36 are pivotally connected together and are each also pivotally connected to upper beam 32. Beams 36 are each also respectively pivotally anchored within a protective housing 38 for generally upward movement in an extendible and retractable scissors-fashion. Support beams 36 are moved by the actuating means 20 which, in the preferred embodiment, includes an actuator in the form of a double-acting hydraulic cylinder 40. Cylinder 40 extends and is pivotally connected between beams 36, as more clearly shown in FIG. 1. Beams 36 situate or dispose the upper beam 32 such that its forward end, upon which the hook member 16 is supported, extends through a vertical slot 42 formed in the front of the housing 38. Extension of the cylinder 40 pivotally raises the upper beam 32 causing the hook member 16 to be moved on an upward stroke from an inoperative lowered position, as seen in FIG. 2, toward an operative raised position, as seen in FIG. 1. Retraction of the cylinder 40 pivotally lowers the beam 32 causing the hook member 16 to be moved on a return downward stroke away from the operative raised position toward the inoperative lowered position.

Figure 4:
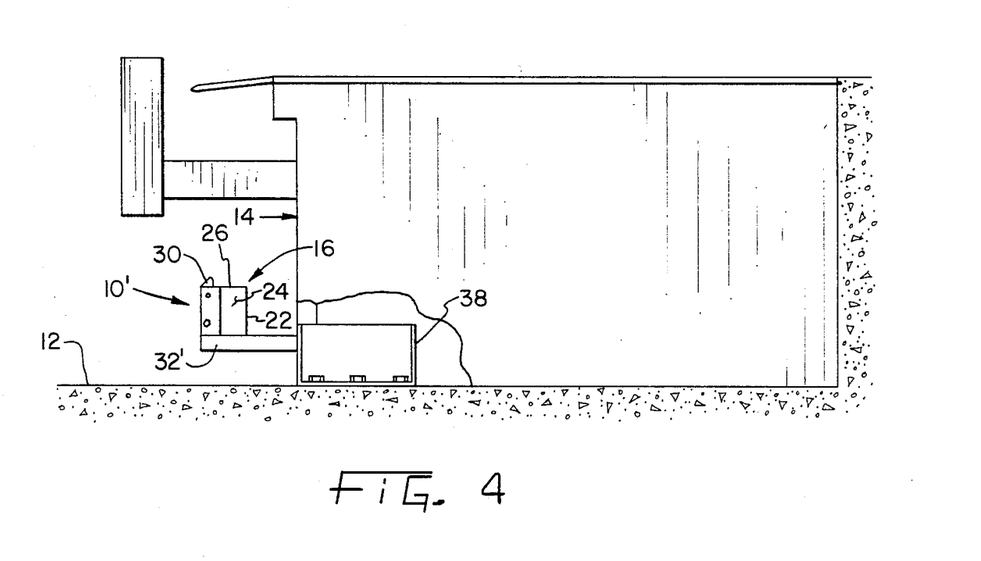
FIG. 4 is a side elevational view of another embodiment of the vehicle restraining apparatus of the present invention being shown positioned within the loading dock.
Figure 5:
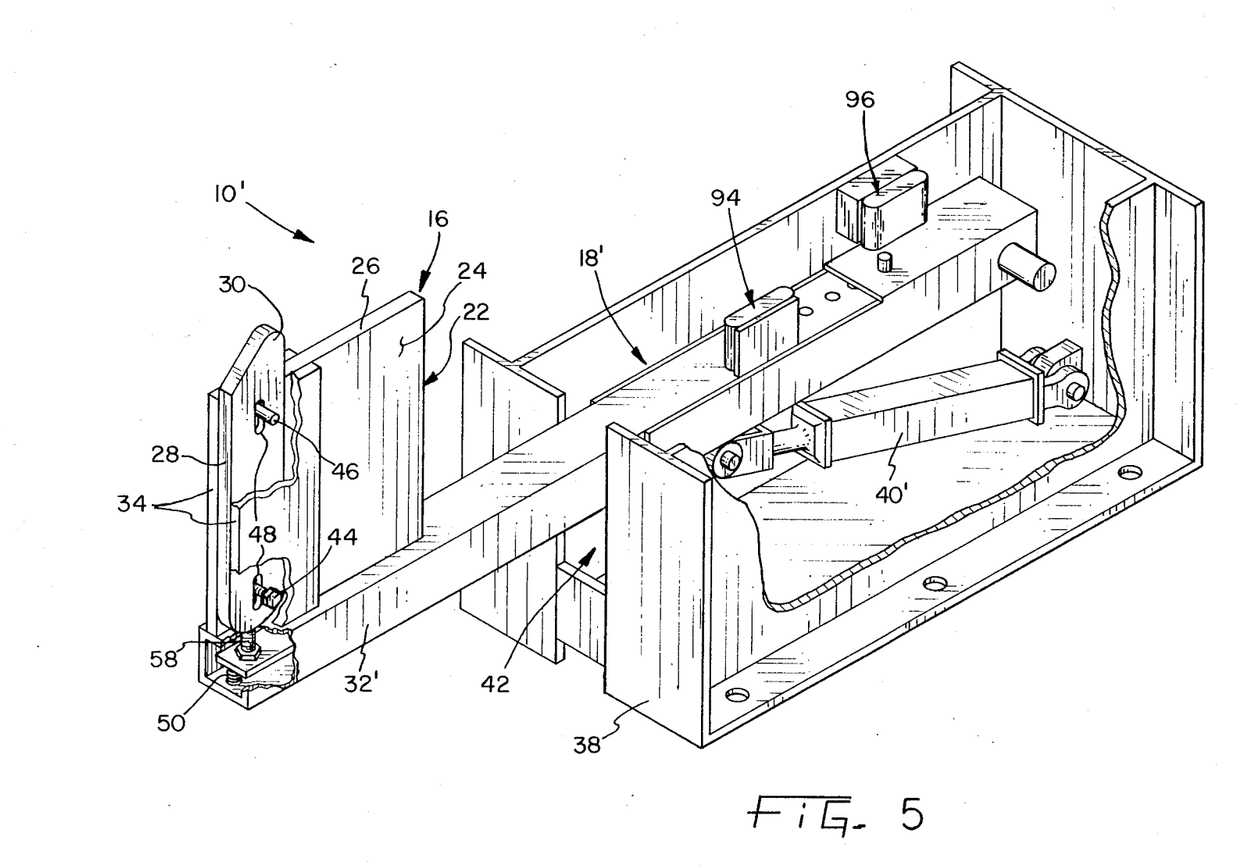
FIG. 5 is a perspective partial cut-away view of the vehicle restraining apparatus of FIG. 4.

Whereas the hook member 16, the beam arrangement 18 and the actuating means 20 of the one embodiment of the restraining apparatus 10 shown in FIGS. 1 and 2 are disposed externally of the loading dock 14, in another embodiment as shown in FIGS. 4 and 5, most of the apparatus 10' is disposed internally of the dock 14. More specifically, double-acting hydraulic cylinder 40' is disposed within housing 38 inside of the loading dock 14 and the beam arrangement 18', now in the form of a single beam 32', being telescopible for varying its length, is disposed at least partially inside of the loading dock 14. It should be noted that most of the components of actuating means 20, in both embodiments, may be located either within or outside of dock 14 and/or housing 38. Beam arrangement 18' has its forward end extending through the housing front slot 42 and through an opening in the dock 14 such that the hook member 16 is disposed externally thereof. Thus, in the second embodiment, only the hook member 16 extends beyond the face of the dock 14 and the vulnerability of damage to the apparatus 10' is minimized.

In the restraining apparatus of the above-described embodiments, the hook member 16 has the same construction and function and the tip-defining upright bar 28 is supported the same way between the upstanding plates 34. Upright bar 28 of the hook member 16 is supported so as to provide restraint under normal conditions but to allow for emergency release of the vehicle ICC bar from the hook member 16 in case of a power interruption. Further, upright bar 28 is supported to minimize damage to the vehicle and apparatus 10 should the pull of the vehicle away from the dock be greater than a predetermined level of force, i.e., 20,000 pounds or more.

More specifically, upright bar 28 of hook member 16 is slidingly held in position between upstanding plates 34 via bolt or shaft 44 and pin 46. As more clearly shown in FIG. 5, bolt 44 and upper pin 46 both extend through respective lower and upper aligned and vertically extending elongated slots 48 defined in the upright bar 28. The vertical lengths of the slots 48 are substantially greater than the diameter of bolt 44 and pin 46, whereas the horizontal widths of the slots are only slightly greater than the bolt 44 and pin 46 diameters. Also, the lower bolt 44 and upper pin 46 both extend through lower and upper pairs of aligned holes 49 defined in the pair of upstanding plates 34. Thus, upright bar 28 is vertically slidable upwardly and downwardly to the extent that slots 48 will allow. In this regard, spring 50 located between the bottom of bar 28 and the upper beam 32, biases bar 28 upwardly so that bolt 44 and pin 46 are normally in contact with the lower ends of slots 48. Further, upright bar 28 is slidable downwardly by overcoming the force of spring 50.

Furthermore, so long as pin 46 extends through the upper pair of holes 49 and upper slot 48, bar 28 is prevented from pivoting relative to the upstanding plates 34. However, the shearing of pin 46, or the withdrawal thereof, allows upright bar 28 to pivot around bolt 44 and allows the upper tip 30 of bar 28 to move away from upper edge 26 of plate 22 and downwardly therefrom, thereby clearing the vehicle ICC bar which may have been held in position by tip 30. Tip bar 28 is reset by rotating it back to the vertical position and replacing pin 46. Furthermore, various size pins 46 may be utilized for achieving the above-discussed predetermined level of force at which point the pull of the vehicle causes pin 46 to shear and the release of the vehicle.

Figure 6:
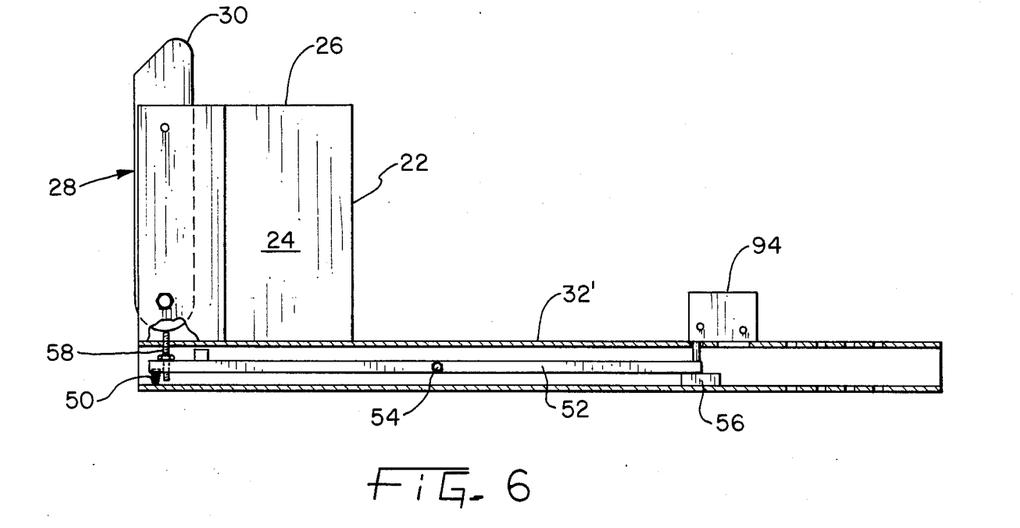
FIG. 6 is a longitudinal sectional view of a beam of the apparatus of FIG. 5, showing an arrangement for supporting a restraining bar of the apparatus upon the beam.

An arrangement for supporting upright bar 28 in a particular desired vertical position above hollow beam 32' is shown in FIG. 6. A lever arm 52, being disposed within hollow beam 32', is fulcrumed at approximately its midpoint for pivotal movement within the beam by a shaft 54 mounted across the beam. The spring 50 supports a forward end of the arm 52, biasing it to move upwardly and the arm to move clockwise about shaft 54. A block 56 affixed to a rear end of arm 52, through engagement upon the bottom structure of the beam 32', limits downward movement of the arm rear end and, thus, clockwise movement of the arm itself. A bolt 58 threaded upright through the forward end of arm 52 adjacent to spring 50 underlies the lower end of the upright bar 28 and can be adjusted to place the bar 28 at the desired vertical position. A downward force imposed on the bar 28 will cause counterclockwise movement of lever arm 52 and compression of spring 50, allowing downward movement of the bar 28 and tripping limit switch 94. When the downward force is removed, the spring 50 will restore the bar 28 upwardly back to its original position.

Figure 3:
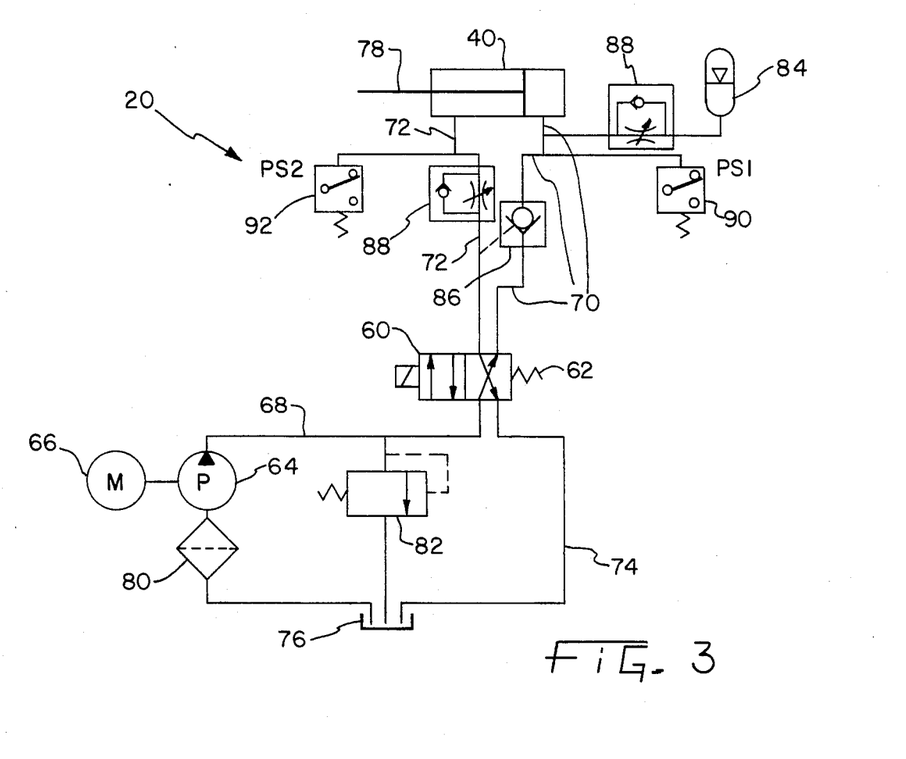
FIG. 3 is a schematic of the hydraulic circuit associated with the vehicle restraining apparatus of FIG. 2.

Turning to FIG. 3, there is seen one exemplary embodiment of the other components of the actuating means 20 as well as components providing the means for sensing the presence of any one of the three conditions concerning the placement of the vehicle ICC bar with respect to the hook member 16 and concurrently therewith for providing an indication of which condition prevails. The above-described embodiments of the restraining apparatus, as well as the embodiment of FIG. 8 described hereinafter, can use the components illustrated in FIG. 3.

As seen in FIG. 3, the actuating means 20 includes the hydraulic cylinder 40 which is coupled to a four-way, two-position valve 60 which is selectively movable by the dock attendant. Valve 60 is biased by a spring 62 to an offset left position as seen in FIG. 3. In the left valve 60 position, hydraulic pump 64, operated by a motor 66, supplies hydraulic fluid under pressure along lines 68 and 70 through the right half of the valve 60 to the right end of the cylinder 40 which causes extension thereof and the upward raising of hook member 16. Lines 72 and 74 connect the left end of cylinder 40 through the right half of the valve 60 to a fluid reservoir 76 allowing fluid under certain conditions to drain from the left cylinder end to reservoir 76 as a piston rod 78 of cylinder 40, which is pivotally connected to either beam 36 or upper beam 32', extends.

Movement of the valve 60 to the opposite offset right position causes the opposite to occur. Hydraulic fluid under pressure, supplied from the pump 64 along the lines 68 and 72 through the left half of the valve 60 to the left end of the cylinder 40, causes the retraction of the piston rod 78 thereof and, thus, the downward lowering of hook member 16. Concurrently, fluid drains from the right end of the cylinder 40 through the left half of the valve 60, along lines 70 and 74 back to the reservoir 76.

The actuating means 20 also includes a filter 80 interposed between the reservoir 76 and pump 64. A pressure relief valve 82 is interposed between the feed line 68 and the reservoir 76 and open upon the pressure in line 68 reaching a given predetermined limit. A fluid accumulator 84 is connected to the right end of the cylinder 40 and a pilot-operated check valve 86 is interposed in line 70. Check valve 86 will open for reverse flow upon the pressure in line 72 reaching a given predetermined limit. Additionally, a check valve in parallel with a variable orifice combination 88 is connected between fluid accumulator 84 and the right end of cylinder 40 and, also, between valve 60 and the left end of cylinder 40 in line 70 as shown.

The condition sensing means includes a pair of pressure-actuated single pole double throw switches((PS1 and PS2) 90 and 92 which, as seen in FIG. 3, are respectively connected to the right and left ends of the cylinder 40 and will switch states upon the pressures therein reaching preset limits. PS1 90 and PS2 92 respond to the presence of the desired conditions when the vehicle restraint has been properly engaged and disengaged. Proper engagement is sensed by PS1 90 when beam 32' has pivoted upwardly until the vehicle ICC bar is engaged by the upper edge 26 of hook member 16 halting further extension of the cylinder 40 and causing increase of pressure in the right end thereof to the limit of PS1 which causes it to switch. Proper disengagement is sensed by PS2 92 when beam 32' has pivoted downwardly until the cylinder 40 is fully retracted, causing increase of pressure in the left end thereof to the limit of PS2 92 which causes it to switch.

Also, the condition sensing means includes a pair of limit switches (LS1 and LS2) 94 and 96 being shown in FIG. 5 mounted respectively on arm 32' and housing 38 to respond to the presence of two undesired conditions, one being where the vehicle restraint has been improperly engaged and the other where it misses altogether. Improper engagement is sensed by LS1 94 when the vehicle ICC bar is engaged by the tip 30 of the hook member 16, instead of the upper edge 26. The other condition is sensed by LS2 96 when the hook member 16 misses the ICC bar altogether.

Figure 7:
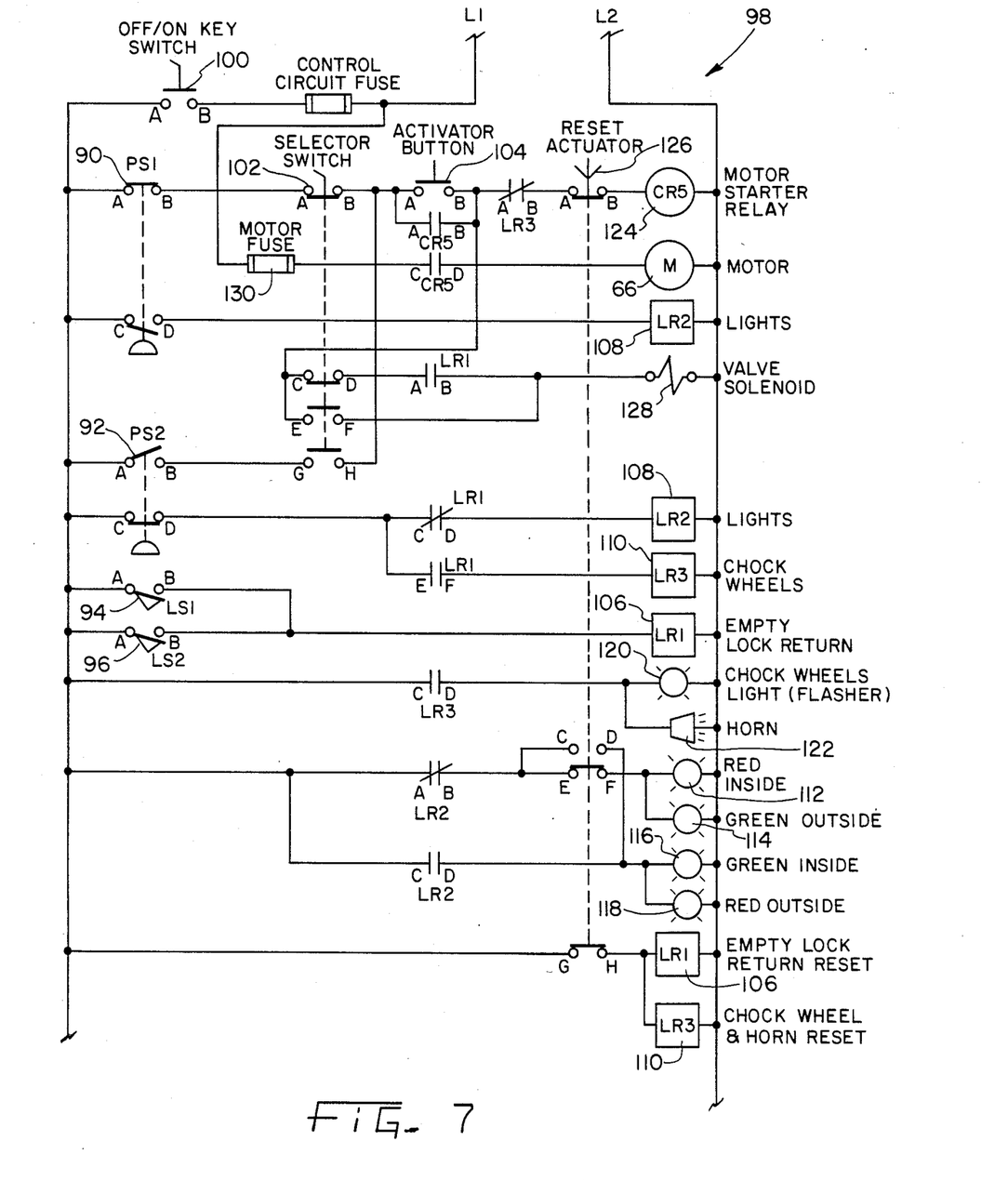
FIG. 7 is a schematic diagram of the control and condition indicating circuit of the vehicle restraining apparatus according to the present invention; and, FIG. 8 is a side elevational view of yet another embodiment of the vehicle restraining apparatus of the present invention.

Referring now to FIG. 7, there is shown a schematic diagram of a control and condition indicating circuit, generally designated 98. PS1 90, PS2 92, LS1 94 and LS2 96 of the condition sensing means are also illustrated in FIG. 7. The circuit 98 is wired between a pair of line power supply conductors L1 and L2 and includes an off/on switch 100 connected in conductor L1 which must be manually turned on or off by insertion of a key by an operator. Also, circuit 98 includes a selector switch 102 being actuatable by the operator between "raise" and "lower" positions. The selector switch 102 has sets of contacts A/B, C/D, E/F and G/H which assume respective closed, closed, opened and opened conditions when the switch 102 is in its "raise" position and assume opposite conditions when the switch is in its "lower" position. Further, an actuator button 104 having contacts A/B is provided in the circuit 98 which must be pushed to activate the circuit 98.

Additionally, the circuit 98 has first, second and third latching relays (LR1, LR2 and LR3) 106, 108 and 110. LR1 106 has three pairs of contacts, A/B, C/D and E/F. LR2 108 has two pairs of contacts, A/B and C/D. LR3 has two pairs of contacts, A/B and C/D. LR1 106 is connected between conductors L1 and L2 in series with pairs of contacts A/B of parallel-connected LS1 94 and LS2 96. LR2 108 is connected between conductors L1 and L2 in series with the contacts C/D of PS1 90 and also separately in series with contacts C/D of PS2 92 and contacts C/D of LR1 106. LR3 110 is connected between conductors L1 and L2 in series with contacts C/D of PS2 92 and contacts E/F of LR1 106.

Further, the circuit 98 has a series of lights which alert the operator and others in the vicinity of the loading dock 14 both inside and outside of the facility to which the dock is attached of what are the particular conditions prevailing at any given moment with respect to the vehicle restraint apparatus 10. First, there is provided a pair of red inside and green outside lights 112 and 114, respectively, and a pair of green inside and red outside lights 116 and 118, respectively. Red inside and green outside lights 112 and 114, respectively, which are turned on when the apparatus 10 is unlocked are connected in parallel with one another and in series with contacts A/B of LR2 108 between conductors L1 and L2. Green inside and red outside lights 116 and 118, respectively, which are turned on when the apparatus 10 is locked are connected in parallel with one another and in series with contacts C/D of LR2 108 between conductors L1 and L2. Also, a flasher light 120 carrying the legend "chock wheels" is connected in parallel with a horn 122 and both are connected between conductors L1 and L2 in series with contacts C/D of LR3 110. The flasher light 120 and horn 122 are respectively turned on and make an audible noise when either of the undesired conditions of when the tip 30 of the hook member 16 hits the ICC bar or the hook member 16 misses the ICC bar entirely.

Finally, the circuit 98 includes a motor starter relay CR5 124 having two pairs of contacts A/B and C/D, a reset actuator 126 having four pairs of contacts A/B, C/D, E/F and G/H, and a valve solenoid 128. CR5 124 is connected between conductors L1 and L2 in series with contacts A/B of PS1 90, contacts A/B of selector switch 102, contacts A/B of actuator button 104, contacts A/B of LR3 110 and contacts A/B of reset actuator 126. Also, contacts A/B of CR5 124 are connected in parallel with contacts A/B of actuator button 104 and in series with CR5 124. Further, motor 66 of FIG. 3 is connected between conductors L1 and L2 in series with contacts C/D of CR5 124 and a motor fuse 130. The valve solenoid 128 is connected between conductors L1 and the parallelly-connected contacts A/B of actuator button 104 and contacts A/B of CR5 124. Connected in series with the solenoid 128 are contacts C/D of selector switch 102 and contacts A/B of LR1 106. Also, contacts E/F of selector switch 102 are connected in series with solenoid 128 and in parallel with serially-connected contacts C/D of selector switch 102 and contacts A/B of LR1 106.

Lastly, the remaining contacts of the reset actuator 126 are connected between the conductors L1 and L2. Particularly, contacts C/D of reset actuator 126 are connected in series with contacts A/B of LR2 108 and green inside and red outside lights 116, 118, whereas contacts E/F of reset actuator 126 are connected in series with contacts A/B of LR2 108 and red inside and green outside lights 112, 114. Contacts G/H of reset actuator 126 are connected in series with LR1 106 and LR3 110 which are connected in parallel with one another.

In the standard operational sequence of the restraint apparatus 10, after the vehicle is backed against the loading dock 14, the dock attendant places the selector switch 102 on "raise" as shown and pushes the actuator button 104 so as to momentarily close its contacts A/B. Due to the now closed conditions of respective contacts A/B of switch 102 and button 104 and the normally closed conditions of respective contacts A/B of LR3 110 and reset actuator 126, the circuit branch from conductor L1 to L2 through CR5 124 is closed and CR5 is activated. Activation of CR5 124, in turn, causes closing of its pairs of contacts A/B and C/D which maintains activation of CR5 even after actuator button 104 is released and which turns on the motor 66 and thereby initiates operation of the pump 64 of FIG. 3. Since the valve 60 is in its offset left position, fluid is pumped to the right end of the cylinder 40 whereby it is extended raising hook member 16 generally upwardly. Such action normally causes the hook member 16 to rise toward the ICC bar bringing its upper edge 26 into engagement with the ICC bar and the tip 30 of the hook member 16 in position for restraining the vehicle via its ICC bar from leaving the loading dock. The series of red and green lights 112–118 being located both inside and outside of the terminal facility work automatically in conjunction with the status of the hook member. The inside lights 112, 116 are always lit the opposite of the outside lights 114, 118. Initially the red inside light 112 and green outside light 114 are turned on since reset contacts E/F and LR2 108 contacts A/B are normally in closed condition. This alerts the personnel that no truck is presently locked, or properly engaged, at the dock by the restraining apparatus 10 and, thus, no loading can take place yet.

The presence of a first one of the multiple conditions, such being where the vehicle restraint apparatus 10 has been properly engaged, is sensed hydraulically by the first pressure switch PS1 90 of the sensing means when the vehicle ICC bar is properly engaged by the upper edge 26 of the hook member 16 and subsequent to the accumulator 84 being partially filled and pressurized. Sensing of the aforementioned first condition causes termination of the operation of the motor 66 and pump 64 and of the extension of the cylinder 40 and switching of lights 112–118. Specifically, normally closed contacts A/B of PS1 90 now switch to open condition in response to pressure in the right end of the cylinder 40 reaching the limit of PS1 90. Opening of PS1 90 contacts A/B opens the circuit branch containing CR5 124, which deactivates the same and opens its contacts A/B and C/D. Opening of CR5 124 contacts C/D terminates operation of motor 66 and thereby of pump 64, maintaining the piston rod 78 of cylinder 40 in extended position. Further, normally open contacts C/D of PS1 90 now switch to closed condition in response to pressure in the right end of the cylinder 40 reaching the limit of PS1 90. Closure of PS1 90 contacts C/D actuates LR2 108 and switches normally closed contacts A/B thereof to open condition and normally open contacts C/D thereof to closed condition. As a result, red inside and green outside lights 112, 114 are turned off and green inside and red outside lights 116, 118 are turned on. This alerts personnel that it is okay to begin loading the locked vehicle and alerts the driver not to move the vehicle.

The accumulator 84, in being connected to the right end of the cylinder 40, allows the hook member 16 once raised into engagement with the ICC bar to then follow the various vehicle heights as it moves vertically upwardly and downwardly while being loaded or unloaded. Thus, the hook member 16 is maintained in restraining relationship with the vehicle, and the lights 116, 118 are lit in the appropriate way providing an indication that placement of the hook member 16 in the restraining relationship with the vehicle was properly achieved and is properly being maintained.

After the vehicle is loaded or unloaded, as the case may be, the dock attendant then selects the "lower" position of the selector switch 102 and pushes the actuator button 104. Selecting the "lower" position of the selector switch 102 switches its contacts A/B, C/D, E/F and G/H to respective open, open, closed and closed conditions. Contacts A/B of PS2 92 are normally closed (being only switched to open condition when the pressure limit of PS2 92 is reached upon retraction of cylinder 40). Now, since contacts A/B of selector switch 102 are open, the circuit branch containing CR5 124 is completed between conductors L1 and L2 via closed contacts A/B of PS2 92 and closed contacts G/H of selector switch 102 when the actuator button 104 is depressed to momentarily close its contacts A/B. Again, activation of CR5 124 switches its contacts A/B and C/D to closed conditions which maintains CR5 124 activated and turns on motor 66. However, switching of contacts E/F of selector switch 102 to closed condition causes activation of valve solenoid 128 which, in turn, causes the valve 60 to shift to its offset right position now allow pumping of fluid to the left end of cylinder 40 thereby causing retraction of the piston rod 78 and lowering and release of the hook member 16 from the vehicle ICC bar. When cylinder 40 is fully retracted, pressure builds up in the left end thereof until it reaches the limit of PS2 92 and switches its contacts A/B and C/D to respective open and closed conditions. Opening of PS2 92 contacts A/B breaks the circuit through the branch containing CR5 124 which opens its contacts A/B and C/D and leaves cylinder 40 in its retracted position. Opening of PS2 92 contacts A/B also breaks the circuit through the branch containing valve solenoid 128 which allows the spring 62 biasing the valve 60 to shift it back to its offset left position. Also, closing of PS2 92 contacts C/D deactivates LR2 108 allowing respective closing and opening of the latter's contacts A/B and C/D and, thus, switching of green inside and red outside lights 116, 118 off and red inside and green outside lights 112, 114 on. This alerts the driver that it is okay to drive away from the dock and the facility personnel to discontinue loading or unloading.

As mentioned earlier, the restraining apparatus 10 is also operable to respond to the presence of two other conditions, one being where the vehicle restraint has been improperly engaged and the other where it misses altogether. The second condition, improper engagement, is sensed by LS1 94 when the vehicle ICC bar is engaged by the tip 30 of the hook member 16, instead of the upper edge 26. The other condition is sensed by LS2 96 when the hook member 16 misses the ICC bar altogether. When either of these two conditions is sensed by the apparatus 10, the flasher light 120 and horn 122 are respectively turned on and sounded which alerts the dock operator that an alternative measure such as cocking the wheels must be undertaken to restrain the vehicle.

More particularly, sensing of the presence of the second condition, wherein the tip 30 of the hook member 16 engages the ICC bar before the edge 26 thereof can contact it, causes switching of contacts A/B of LS1 94 from open to closed condition which causes reverse actuation of the hydraulic cylinder 40. Closure of contacts A/B of LS1 94 activates LR1 106 which closes its contacts A/B and E/F and opens its contacts C/D. Closure of LR1 106 contacts A/B activates valve solenoid 128 and switches the valve 60 to the offset right position allowing flow of fluid to the left end of cylinder 40 and retraction thereof. Closure of contacts E/F and opening of contacts C/D of LR1 106 maintains LR2 108 in deactivated condition and activates LR3 110 when cylinder 40 is retracted and pressure limit of PS2 92 is reached switching its contacts C/D to closed condition. Maintaining LR2 108 deactivated maintains red inside and green outside lights 112, 114 turned on. Activation of LR3 110 closes its contacts C/D and turns on chock wheels flasher light 120 and the horn 122. Also, activation of LR3 110 opens its contacts A/B and deactivates CR5 124 and thereby motor 66 and pump 64. The flashing of the light 120 and sounding of the horn 122 provides the aforementioned indication that placement of the hook member 16 in restraining relationship with the vehicle was not properly achieved, which alerts an attendant to follow an alternative course of action such as chocking the wheels to restrain the vehicle. A mechanical limit switch could also be positioned below the tip bar 28 to detect downward displacement of the bar which occurs only when this second condition occurs. For instance, such detection might take place after the bar 28 moves downwardly against the bias of spring 50 from $\frac{1}{8}$ to $\frac{1}{4}$ of one inch.

Sensing of the presence of the third condition, wherein the hook member 16 misses the ICC bar altogether, causes switching of contacts A/B of LS2 96 from open to closed conditions which causes reverse actuation of the hydraulic cylinder 40. Closure of contacts A/B of LS2 96 activates LR1 106 which closes its contacts A/B and E/F and opens its contacts C/D. Closure of LR1 106 contacts A/B activates valve solenoid 128 and switches the valve 60 to the offset right position allowing flow of fluid to the left end of cylinder 40 and retraction thereof. Closure of contacts E/F and opening of contacts C/D of LR1 106 maintains LR2 108 in deactivated condition and activates LR3 110 when cylinder 40 is retracted and pressure limit of PS2 92 is reached switching its contacts C/D to closed condition. Maintaining LR2 108 deactivated maintains red inside and green outside lights 112, 114 turned on. Activation of LR3 110 closes its contacts C/D and turns on chock wheels flasher light 120 and the horn 122. Also, activation of LR3 110 opens its contacts A/B and deactivates CR5 125 and thereby motor 66 and pump 64. Again, the flashing of the light 120 and sounding of the horn 122 provides the aforementioned indication that placement of the hook member 16, in restraining relationship with the vehicle, was not properly achieved which alerts an attendant to follow an alternative course of action to restrain the vehicle. Another mechanical limit switch could also be positioned adjacent the beam 32 to detect upwardly pivotal displacement of the beam beyond the point where the ICC bar should have been engaged by the edge 26, which occurs only when this third condition occurs.

The reset actuator 126 is actuated to momentarily open its contacts G/H to deactivate LR1 106 and LR3 110. Deactivation of LR1 106 allows its contacts A/B and E/F to return to open conditions and its contacts C/D to return to a closed condition. Deactivation of LR3 110 allows its contacts A/B to return to closed condition and its contacts C/D to return to open condition, turning off the flasher light 120 and horn 122.

Figure 8:
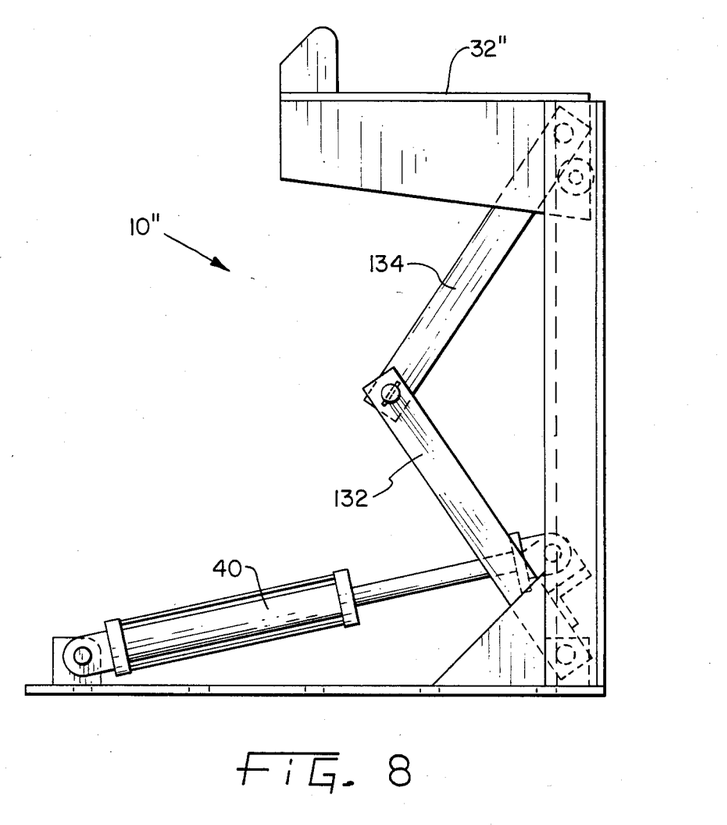

FIG. 8 illustrates another embodiment of the restraining apparatus 10″ of the present invention. In this embodiment, retraction of the cylinder 40 causes folding of pivotally connected links 132, 134 toward one another and downward pivoting and lowering of the beam 32″ being pivotally connected at its opposite ends to upper and lower ends of respective links 132, 134. On the other hand, extension of the cylinder 40 caused vertical straightening of the links 132, 134 away from one another and toward the beam 32″ and upward pivoting and raising thereof to move the tip 30 on the hook member 16 into restraining relationship with an ICC bar (not shown). It should be readily apparent that the circuit 98 and limit switches LS1 94 and LS2 96 can be associated with the embodiment of the apparatus 10″ of FIG. 8 and operate therewith in the same fashion as described above with respect to the embodiment of FIG. 5.

It is thought that the vehicle restraining apparatus of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. A multi-condition responsive vehicle restraining apparatus, comprising:
    (a) a hook member having a vehicle-contacting edge and a vehicle-restraining tip located along said edge and extending upwardly therefrom;
    (b) means mounting said hook member and being movable for moving said hook member on a substantially upward stroke from an inoperative lowered position toward an operative raised position and on a return stroke away from said operative raised toward said inoperative lowered position;
    (c) means for actuating said mounting means to move said hook member on its upward and return strokes; and,
    (d) means for sensing the presence of multiple conditions concerning the placement of a vehicle with respect to said hook member and concurrently therewith providing an indication of which condition prevails, the conditions being that restraint of the vehicle has been either properly engaged, improperly engaged, or missed, and wherein the presence of one of said multiple conditions in which vehicle restraint has been improperly engaged is sensed when the vehicle is engaged by said vehicle-restraining tip of said hook member whereby said vehicle-restraining tip moves relative to and substantially perpendicular to said vehicle contacting edge for indicating said improper engagement.

2. The restraining apparatus as recited in cliam 1, wherein the presence of one of said multiple conditions in which vehicle restraint has been properly engaged is sensed when the vehicle is engaged by said vehicle-contacting edge of said hook member.

3. The restraining apparatus as recited in claim 2, wherein sensing of said one condition causes termination of actuation of said mounting means which maintains said hook member in restraining relationship with said vehicle, and provides an indication that placement of said hook member in the restraining relationship with the vehicle was properly achieved.

4. The restraining apparatus as recited in claim 4, wherein sensing of said one condition causes reverse actuation of said mounting means which moves said hook member on its return stroke, and provides an indication that placement of said hook member in restraining relationship with the vehicle was not properly achieved which alerts an attendant to follow an alternative course of action to restrain the vehicle.

5. The restraining apparatus as recited in claim 1, wherein the presence of one of said multiple conditions in which vehicle restraint has been missed is sensed when the vehicle is not engaged by said hook member.

6. The restraining apparatus as recited in claim 5, wherein sensing of said one condition causes reverse actuation of said mounting means which moves said hook member on its return stroke, and provides an indication that placement of said hook member in the restraining relationship with the vehicle was not achieved which alerts an attendant to follow an alternative course of action to restrain the vehicle.

7. The restraining apparatus as recited in claim 1, wherein said hook member, mounting means and actuating means are disposed externally of a loading dock.

8. The restraining apparatus as recited in claim 1, wherein said actuating means is disposed internally of a loading dock and said mounting means is disposed at least partially internally of the loading dock with said hook member being disposed externally thereof.

9. The restraining apparatus as recited in claim 1, wherein said mounting means is a pivotally mounted beam supporting said hook member on a forward end thereof.

10. The restraining apparatus as recited in claim 9, wherein said tip of said hook member at its lower end is pivotally mounted to said beam and at its upper end is secured thereto by a nonpivotal connection provided by a pin which is releasable for allowing pivoting of said tip of said hook member relative to said bam and releasing of the vehicle restraint by said hook member.

11. The restraining apparatus as recited in 1, wherein said mounting means is a plurality of beams connected together for movement in an extendible and retractable scissors fashion and supporting said hook member on a forward end thereof.

12. The restraining apparatus as recited in claim 11, wherein said tip of said hook member at its lower end is pivotally mounted to a forward end of one of said beams and at its upper end is secured thereto by a nonpivotal connection provided by a pin which is releasable for allowing pivoting of said tip of said hook member relative to said beam and releasing of the vehicle restraint by said hook member.

13. The restraining apparatus as recited in claim 1, wherein said actuating means includes a double-acting hydraulic cylinder.

14. The restraining apparatus as recited in claim 13, wherein said sensing means includes pressure-sensitive switches coupled to respective opposite ends of said hydraulic cylinder for sensing the pressure therein and being operable to terminate actuation of said cylinder upon sensing preset limits of pressure therein.

15. The restraining apparatus as recited in claim 13, wherein said actuating means further includes a selector valve shiftable between first and second positions for causing respective extension and retraction of said hydraulic cylinder.

16. The restraining apparatus as recited in claim 15, wherein said sensing means is operable to shift said selector valve from its first to second position upon sensing the presence of said conditions wherein restraint of the vehicle has been improperly engaged or has been missed.

17. The restraining apparatus as recited in claim 16, wherein said sensing means includes limit switches for respectively sensing displacement of said vehicle-restraining tip and said hook member past predetermined limits for sensing said conditions wherein restraint of the vehicle has been improperly engaged or has been missed.

18. The restraining apparatus as recited in claim 1, wherein said sensing means includes a plurality of limit switches for respectively sensing displacement of said vehicle-restraining tip and said hook member past predetermined limits for sensing said conditions wherein restraint of the vehicle has been improperly engaged or has been missed.

19. A multi-condition responsive vehicle restraining apparatus, comprising:

(a) a hook member having an edge for contacting an ICC bar on a vehicle and a tip located at one end of said edge extending upwardly therefrom and movable relatively perpendicular thereto;

(b) means mounting said hook member at an outer end thereof and being pivotal for moving said hook member on a substantially upward stroke from an inoperative lowered toward an operative raised position and on a return stroke away from said operative raised toward said inoperative lowered position;

(c) means for actuating said mounting means to move said hook member on its upward and return strokes; and (d) means for sensing the presence of three conditions concerning the placement of the vehicle ICC bar with respect to said hook member wherein the presence of a first condition in which proper vehicle restraint has been achieved is sensed when the vehicle ICC bar is engaged by said hook member edge causing termination of actuation of said mounting means which maintains said hook member in restraining relationship with said vehicle, the presence of a second condition in which improper vehicle restraint has been achieved is sensed when the vehicle ICC bar is engaged by said tip of said hook member which, after movement relative to the hook member, causes reverse actuation of said mounting means which moves said hook member on its return stroke and providing an indication that placement of said hook member in the restraining relationship with the vehicle was not properly achieved which alerts an attendant to follow an alternative course of action to restrain the vehicle, and the presence of a third condition in which the vehicle restraint has been missed is sensed when the vehicle ICC bar is not engaged by said hook member causing reverse actuation of said mounting means which moves said hook member on iss return stroke and providing an indication that placement of said hook member in restraining relationship with the vehicle was not achieved which alerts an attendant to follow an alternative course of action to restrain the vehicle.

20. The restraining apparatus as recited in claim 19, wherein said hook member and actuating means are disposed externally of a loading dock.

21. The restraining apparatus as recited in claim 19, wherein said actuating means is disposed internally of a loading dock and said mounting means is disposed at least partially internally of the loading dock with said hook member disposed externally thereof.

22. The restraining apparatus as recited in claim 19, wherein said mounting means is a pivotally mounted beam supporting said hook member on a forward end thereof.

23. The restraining apparatus as recited in claim 22, wherein said tip of said hook member at its lower end is pivotally mounted to said beam and at its upper end is secured thereto by a nonpivotal connection provided by a pin which is releasable for allowing pivoting of said tip of said hook member relative to said beam and releasing of the vehicle restraint by said hook member.

24. The restraining apparatus as recited in claim 19, wherein said mounting means is a plurality of beams connected together for movement in an extendible and retractable scissors fashion and supporting said hook member on a forward end thereof.

25. The restraining apparatus as recited in claim 24, wherein said tip of said hook member at its lower end is pivotally mounted to a forward end of one of beams and at its upper end is secured thereto by a nonpivotal connection provided by a pin which is releasable for allowing pivoting of said tip of said hook member relative to said beam and releasing of the vehicle restraint by said hook member.

26. The restraining apparatus as recited in claim 19, wherein said actuating means includes a double-acting hydraulic cylinder.

27. The restraining apparatus as recited in claim 26, wherein said sensing means includes pressure-sensitive switches coupled to respective opposite ends of said hydraulic cylinder for sensing the pressure therein and being operable to terminate actuation of said cylinder upon sensing preset limits of pressure therein.

28. The restraining apparatus as recited in claim 26, wherein said actuating means further includes a selector valve shiftable between first and second positions for causing respective extension and retraction of said hydraulic cylinder.

29. The restraining apparatus as recited in claim 28, wherein said sensing means is operable to shift said selector valve from its first to second position upon sensing the presence of said conditions wherein restraint of the vehicle has been improperly engaged or has been missed.

30. The restraining apparatus as recited in claim 29, wherein said sensing means includes limit switches for respectively sensing displacement of said vehicle-restraining tip and said hook member past predetermined limits for sensing said conditions wherein restraint of the vehicle has been improperly engaged or has been missed.

31. The restraining apparatus as recited in claim 19, wherein said sensing means includes a plurality of limit switches for respectively sensing displacement of said vehicle-restraining tip and said hook member past predetermined limits for sensing said conditions wherein restraint of the vehicle has been improperly engaged or has been missed.

32. A multi-condition responsive vehicle restraining apparatus, comprising:
a hook member having a vehicle-contacting edge and a vehicle-restraining tip located along said edge and extending upwardly therefrom;
means mounting said hook member and being movable for moving said hook member on a substantially upward stroke from an inoperative lowered toward an operative raised position and on a return stroke away from said operative raised toward said inoperative lowered position;
means for actuating said mounting means to move said hook member on its upward and return strokes;
means for sensing the presence of any one of multiple conditions concerning the placement of a vehicle with respect to said hook member and concurrently therewith providing an indication of which condition prevails, the conditions being that restraint of the vehicle has been either properly engaged, improperly engaged, or missed;
wherein the presence of one of said multiple conditions in which vehicle restraint has been improperly engaged is sensed when the vehicle is engaged by said vehicle-restraining tip of said hook member; and,
wherein sensing of said one condition causes reverse actuation of said mounting means which moves said hook member on its return storke, and provides an indication that placement of said hook member in restraining relationship with the vehicle was not properly achieved which alerts an attendant to follow an alternative course of action to restrain the vehicle.

33. A multi-condition responsive vehicle restraining apparatus, comprising:
a hook member having a vehicle-contacting edge and a vehicle-restraining tip located along said edge and extending upwardly therefrom;
means mounting said hook member and being movable for moving said hook member on a substantially upward stroke from an inoperative lowered toward an operative raised position and on a return stroke away from said operative raised toward said inoperative lowered position;
means for actuation said mounting means to move said hook member on its upward and return strokes;
means for sensing the presence of any one of multiple conditions concerning the placement of a vehicle with respect to said hook member and concurrently therewith providing an indication of which condition prevails, the conditions being that restraint of the vehicle has been either properly engaged, improperly engaged, or missed;
wherein the presence of one of said multiple conditions in which vehicle restraint has been missed is sensed when the vehicle is not engaged by said hook member; and,
wherein sensing of said one condition causes reverse actuation of said mounting means which moves said hook member on its return stroke, and provides an indication that placement of said hook member in the restraining relationship with the vehicle was not achieved which alerts an attendant to follow an alternative course of action to restrain the vehicle.

34. A multi-condition responsive vehicle restraining apparatus, comprising:
a hook member having a vehicle-contacting edge and a vehicle-restraining tip located along said edge and extending upwardly therefrom;
means mounting said hook member and being movable for moving said hook member on a substantially upward stroke from an inoperative lowered toward an operative raised position and on a return stroke away from said operative raised toward said inoperative lowered position;
means for actuating said mounting means to move said hook member on its upward and return strokes;
means for sensing the presence of any one of multiple conditions concerning the placement of a vehicle with respect to said hook member and concurrently therewith providing an indication of which conditions revails, the condition being that restrain of the vehicle has been either properly engaged, improperly engaged, or missed;
wherein said mounting means is a pivotal beam supporting said hook member on a forward end thereof; and,
wherein said tip of said hook member at its lower end is pivotally mounted to said beam and at its upper end is secured thereto by a nonpivotal connection provided by a pin which is releasable for allowing pivoting of said tip of said hook member relative to said beam and releasing of the vehicle restraint by said hook member.

35. A multi-condition responsive vehicle restraining apparatus, comprising:

a hook member having a vehicle-contacting edge and a vehicle-restraining tip located along said edge and extending upwardly therefrom;

means mounting said hook member and being movable for moving said hook member on a substantially upward stroke from an inoperative lowered toward an operative raised position and on a return stroke away from said operative raised toward said inoperative lowered position;

means for actuating said mounting means to move said hook member on its upward and return strokes;

means for sensing the presence of any one of multiple conditions concerning the placement of a vehicle with respect to said hook member and concurrently therewith providing an indication of which condition prevails, the conditions being that restraint of the vehicle has been either properly engaged, improperly engaged, or missed;

said mounting means is a plurality of beams connected together for movement in an extendible and retractable scissors fashion and supporting said hook member on a forward end thereof; and, wherein said tip of said hook member at its lower end is pivotally mounted to a forward end of one of said beams and at its upper end is secured thereto by a nonpivotal connection provided by a pin which is releasable for allowing pivoting of said tip of said hook member relative to said beam and releasing of the vehicle restraint by said hook member.

36. A multi-condition responsive vehicle restraining apparatus, comprising:

a hook member having a vehicle-contacting edge and a vehicle-restraining tip located along said edge and extending upwardly therefrom;

means mounting said hook member and being movable for moving said hook member on a substantially upward stroke from an inoperative lowered toward an operative raised position and on a return stroke away from said operative raised toward said inoperative lowered position;

means for actuating said mounting means to move said hook member on its upward and return strokes;

means for sensing the presence of any one of multiple conditions concerning the placement of a vehicle with respect to said hook member and concurrently therewith providing an indication of which condition prevails, the conditions being that restraint of the vehicle has been either properly engaged, improperly engaged, or missed;

wherein said actuating means includes a double-acting hydraulic cylinder;

wherein said actuating means further includes a selector valve shiftable between first and second positions for causing respective extension and retraction of said hydraulic cylinder; and, wherein said sensing means is operable to shift said selector valve from its first to second position upon sensing the presence of said conditions wherein restraint of the vehicle has been improperly engaged or has been missed.

37. The restraining apparatus as recited in claim 36, wherein said sensing means includes limit switches for respectively sensing displacement of said vehicle-restraining tip and said hook member past predetermined limits for sensing said conditions wherein restraint of the vehicle has been improperly engaged or has been missed.

* * * * *

UNITED STATES PATENT AND TRADEMARK OFFICE
CERTIFICATE OF CORRECTION

PATENT NO. : 4,830,563

DATED : May 16, 1989

INVENTOR(S) : William H. Yeakle

It is certified that error appears in the above-identified patent and that said Letters Patent is hereby corrected as shown below:

Column 2, line 6, change "multicondition" to --multi-condition--.

Column 12, Claim 4, line 48, change "Claim 4" to --Claim 1--.

Column 13, Claim 10, line 18, change "bam" to --beam--.

Column 14, Claim 19, line 39, change "iss" to --its--.

Column 16, Claim 32, line 3, change "storke" to --stroke--.

Column 16, Claim 34, line 60, change "revails" to --prevails--.

Column 16, Claim 34, line 60, change "restrain" to --restraint--.

Signed and Sealed this

Twenty-ninth Day of May, 1990

Attest:

HARRY F. MANBECK, JR.

*Attesting Officer*     *Commissioner of Patents and Trademarks*